United States Patent [11] 3,590,818

[72] Inventor Gerald T. Lemole
 1813 S. Blvd., Houston, Tex. 77006
[21] Appl. No. 835,988
[22] Filed June 24, 1969
[45] Patented July 6, 1971

[54] COMBINATION REFERENCE LEVEL INDICATOR, MANOMETER, INTRAVENOUS FLUID SUPPLY MEANS AND MEANS PERMITTING RAPID ADJUSTMENT OF REFERENCE LEVELS IN ACCORDANCE WITH SHIFT IN PATIENT ELEVATION
 8 Claims, 8 Drawing Figs.
[52] U.S. Cl. ................................................ 128/214,
 128/2.05
[51] Int. Cl. ........................................... A61m 5/00,
 A61b 5/02
[50] Field of Search........................................... 128/2.05,
 213, 214, 214.2; 73/388, 402

[56] References Cited
UNITED STATES PATENTS
2,600,324 6/1952 Rappaport.................... 73/388

3,124,133 3/1964 Marbach ..................... 128/214
3,242,920 3/1966 Andersen ..................... 128/2.05
3,413,970 12/1968 Rockwell..................... 128/2.05
3,495,585 2/1970 Halligan et al............... 128/2.05
FOREIGN PATENTS
1,521,639 3/1968 France ........................ 128/2.05
OTHER REFERENCES
 Rowe et al. SURGERY Vol. 61, #2, pp. 318-319, Feb. 1967.

Primary Examiner—Dalton L. Truluck
Attorney—William E. Ford

ABSTRACT: The disclosure disposes a reference level indicator gauge, rapidly adjustable on an adhesive strip to establish a patient reference (right atrium) elevation adjacent a manometer on a corresponding adhesive strip with relation to which the manometer may be rapidly adjusted to establish a matching reference elevation. A three-way stop cock separately, and at various times, places intravenous fluid from a supply source counterpoised against a manometer fluid, intravenous fluid from a vein counterpoised against the manometer fluid, and continues therethrough intravenous fluid from said source to said vein.

PATENTED JUL 6 1971
3,590,818
SHEET 1 OF 2
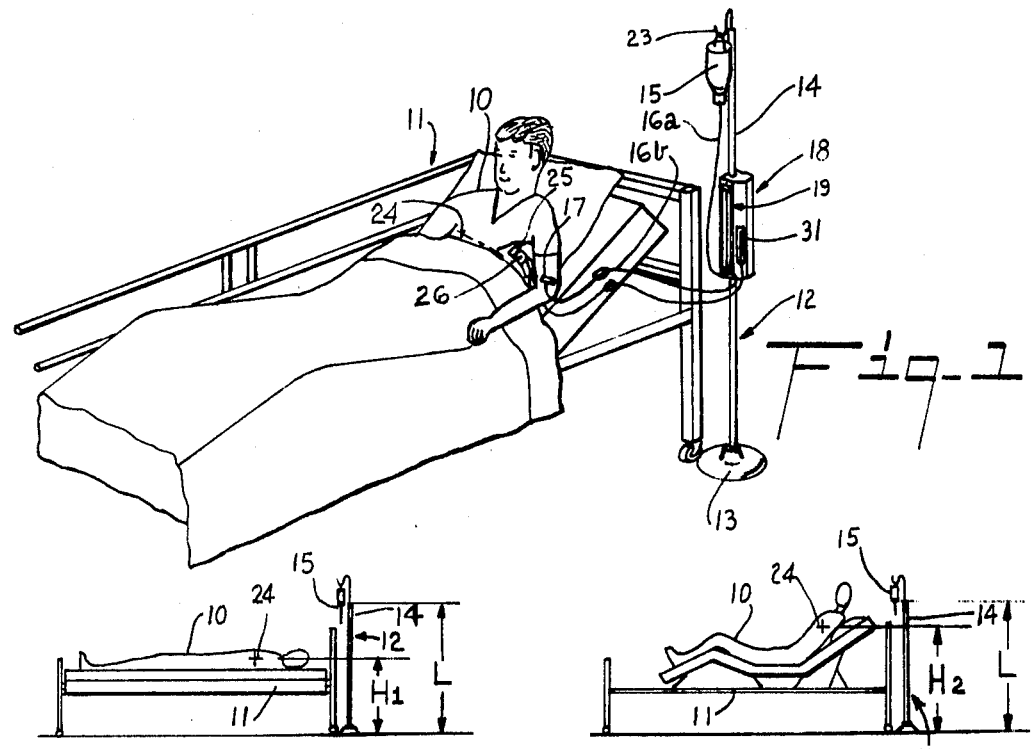
Fig-1
Fig-2
Fig-3
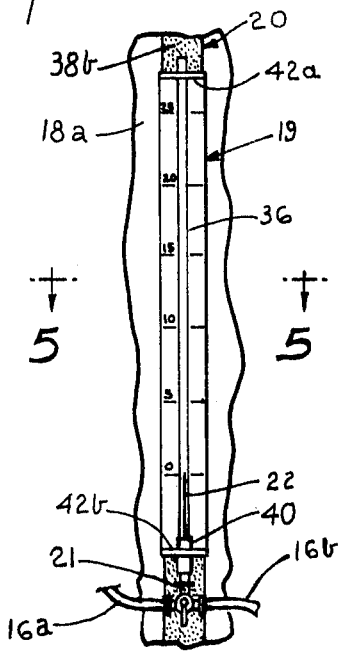
Fig-4
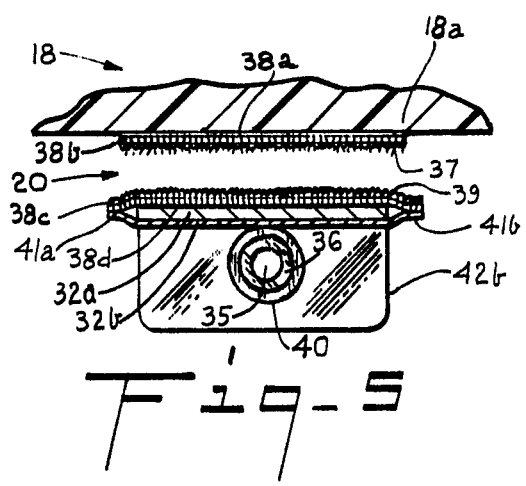
Fig-5
GERALD M. LEMOLE
INVENTOR
BY Wm. E. Ford
ATTORNEY

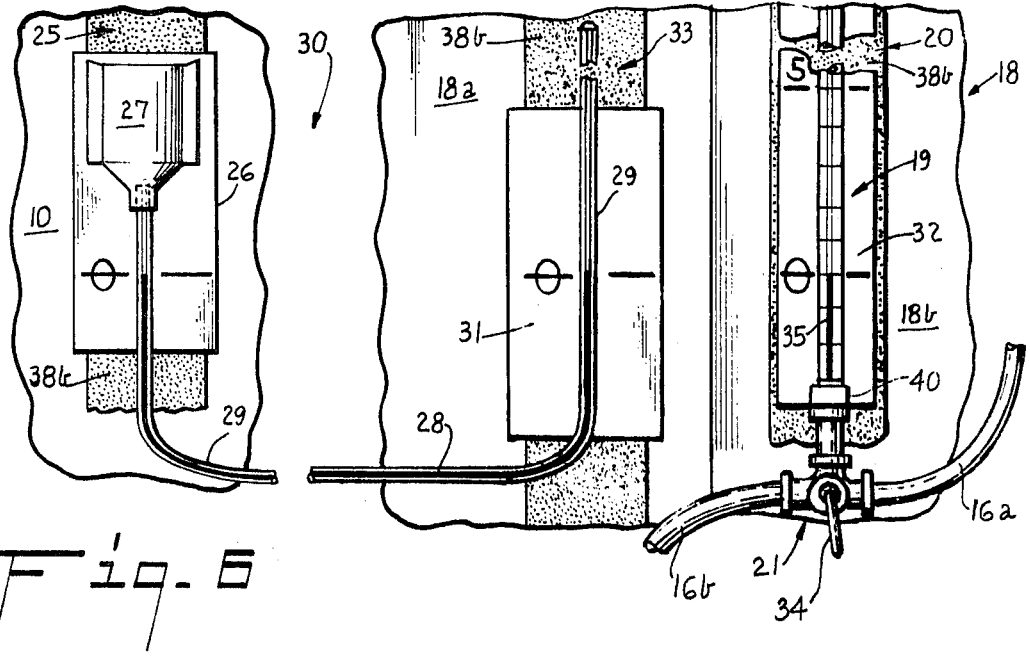
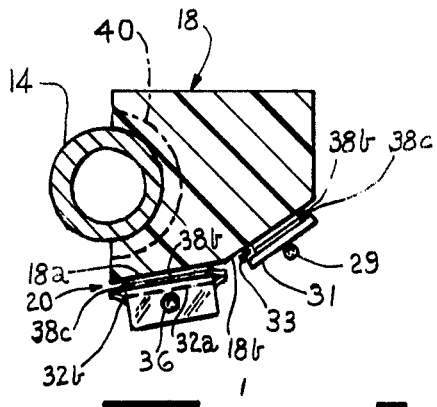
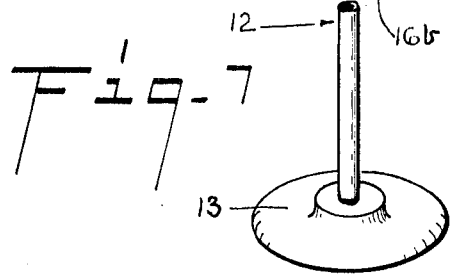

3,590,818

COMBINATION REFERENCE LEVEL INDICATOR, MANOMETER, INTRAVENOUS FLUID SUPPLY MEANS AND MEANS PERMITTING RAPID ADJUSTMENT OF REFERENCE LEVELS IN ACCORDANCE WITH SHIFT IN PATIENT ELEVATION

The invention relates to apparatus including a conventional source of intravenous fluid supply into a patient's vein, a rapidly adjustable level indicator to establish a reference level corresponding with a reference (right atrium) level on the patient, and a manometer gauge also rapidly adjustable in elevation to match its reference level with the indicated reference level. Also, a three-way cock is included to counterpoise fluid from supply source against manometer gauge fluid, to communicate supply fluid and gauge fluid between vein and manometer, and to continue source supplied fluid on therethrough to vein.

Especially in heart surgery, many operations require that intravenous fluid be supplied at predetermined and continuous rates while at the same time the elevation of the patient's heart above floor level has to be changed from time to time, consequently necessitating adjustment of manometer gauge level with reference to these changes of heart (right atrium) reference elevation. Needless to say, these adjustments of manometer gauge reference level should take place as quickly as possible, almost instantaneous adjustment being desired.

Consequently this invention has a primary object the provision of a reference level indicator whereby change of patient reference (right atrium) elevation may be rapidly adjustably indicated on an adhesive strip adjacent manometer gauge which in turn may be accordingly rapidly adjusted on an adhesive strip to match the aforesaid adjusted reference elevation.

The invention also has as an important object the provision of apparatus of the type hereinabove set forth, including a three-way cock at the bottom of the manometer fluid to counterpoise source of supply fluid against manometer fluid, to communicate supply fluid from vein and manometer fluid, and to continue source of supply fluid on therethrough to vein.

Also the invention considers the provision of apparatus of the class described which additionally includes a headstand on which source of intravenous supply fluid, manometer, and comparator end of reference level indicator may be mounted.

Other and further objects will be obvious when the specification herein is considered in connection with the drawings, in which:

FIG. 1 is an isometric view of a patient equipped with a zero or reference level indicator with one end affixed at the elevation of the right atrium (but for convenience on patient's left side), the other end being on a plaque adjustably disposed on headstand strip, the equipment also including a manometer in parallel with an intravenous fluid supply tube, whereby the central venous pressure of the patient may be accurately assessed as counterpoised against fluid level of adjustably disposed manometer (on headstand strip to left of plaque);

FIG. 2 is a diagrammatic elevational view of a patient prone in bed with reference elevation (elevation of right atrium) an intravenous fluid column elevation indicated; whereby it may be seen how patient's right atrium elevation above floor (patient elevated above floor, or with bed raised, patient stationary in bed) affects differential between right atrium level and intravenous fluid column elevation;

FIG. 3 is a diagrammatic elevational view of the patient in FIG. 2 in a propped up in bed position, right atrium reference elevation raised substantially above the FIG. 2 reference elevation position, the intravenous fluid column remaining the same as indicated in FIG. 2;

FIG. 4 is a fragmentary elevational view of a manometer gauge and of a three-way stop cock, (barely discernible on the styrofoam bracket indicated as fixed upon the headstand shown in FIG. 1); also in this view may be seen the special adhesive or "velcro" strip on which the manometer gauge is removably applied for ready adjustment thereon in conformity with elevation changes in patient's right atrium (reference level) positions.

FIG. 5 is a sectional plan view, part in development, taken along line 5-5 of FIG. 4;

FIG. 6 is an enlarged, fragmentary elevational view, partially diagrammatic or in development, showing a dye fluid reservoir attached by special adhesive or "velcro" strip to the patient's chest (right atrium level); showing dye fluid tube as continued to plaque adjustably positionable on "velcro" strip on stand bracket to indicate zero or reference elevation, the manometer gauge, stop cock, tube to patient and from supply bottle being shown, with disposition to right of plaque in this view;

FIG. 7 is an isometric view, at substantially larger scale view than the isometric view of FIG. 1, and showing the fluid bottle carried by the headstand, and apparatus on the styrofoam bracket affixed thereto, such as the manometer gauge and reference level indicating dye tube and its mounting plaque; and FIG. 8 is an enlarged sectional plan view taken through the styrofoam bracket and headstand of FIG. 7, and looking downwardly from above manometer gauge and reference zero level mounting plaque.

Referring now to the drawings in which like reference numerals are assigned to like elements in the various views, a patient 10 in a hospital bed 11 is shown in FIG. 1. A headstand 12 is shown to the left of the patient and adjacent the left head corner of the bed. The headstand comprises a base 13 and a column 14 which upstands therefrom. A hook 23 extends from the top of the column 14 to support a conventional plastic bottle 15 which is filled with a fluid, as glucose, serum, or plasma, to be fed downwardly through a flexible tube 16a, and via a further flexible tube extension 16b thereof, into a vein of the patient 10, the tube 16b being shown taped to the left arm of the patient 10, just above the elbow, by a conventional tape 17.

A bracket 18, as of styrofoam or of any other suitable plastic or light bracket material, is shown in FIGS. 1 and 7 as disposed upon the column 14, and anchored with relation thereto, as by epoxy, any suitable glue, or by a conventional mechanical clamp, not shown. The bracket 18 is indicated as being of polygonal cross section in plan view, with one vertically extending face 18a thereof having a manometer 19 mounted thereon, by means not shown in FIG. 1 because of too small scale, but shown in FIGS. 4—8, inclusive, as an adhesive strip 20, such as a plastic termed "velcro" or any other suitable strip material. The manometer or manometer gauge 19 has a three-way stop cock 21 mounted on the lower end thereof, below the manometer fluid 22, and as shown in FIGS. 4, 6 and 7, the flexible tube 16a from the supply fluid source or bottle 15, connects into one leg of the stop cock 21, and the flexible tube 16b extends from the opposed leg thereof.

The necessary apparatus which must go with the invention to establish a reference level comparable with the reference level of the right atrium 24, FIG. 1, includes an adhesive strip 25, as a plastic, such as "velcro," or of any other suitable adhesive strip material, which has its underside affixed to the patient 10, at the right atrium, or at a suitable place on the patient at a level of approximately right atrium level. Then as a reservoir backing plate, a substantially rigid mounting plate 26, of pasteboard, light metal, fabric or plastic, is mounted on the adhesive strip 25 outer surface to dispose the zero or level gradient thereon substantially at the reference right atrium level as best indicated in FIG. 6. A reservoir 27 for the dye or indicating fluid 28 of the reference level indicator 30 is best shown in FIG. 6 disposed or mounted on the mounting plate 26 above the zero level indication thereon.

As shown, the level indicating fluid or dye 28 stands in a flexible, transparent tube 29 at the level of the zero level indication on the plaque 26, with tube 29 extending downwardly from the reservoir 27, past the zero reference level and therebelow. The tube 29 continues on to the vicinity of the headstand 12 and to the styrofoam bracket 18 thereon, and as shown in FIG. 6, this outward portion of the transparent tube 29 is mounted on a level indicator plaque 31, having a zero level indication thereon. Then, by visual comparison the plaque 31 is disposed on a vertically extending adhesive strip, and the like, as of "velcro" along the bracket surface 18a, in manner that the zero of the plaque 31 and the zero of reservoir mount 26 are at the same elevation.

The aforesaid manometer 19, indicated in FIGS. 1, 4, 5, 7 and 8, as mounted on the bracket surface 18a, is alternatively shown in FIG. 6 as mounted on the bracket surface 18b, while conversely, the plaque 31, indicated in FIGS. 1, 7 and 8 as mounted on the bracket surface 18b, is shown in FIG. 6 as mounted on the bracket surface 18a. As shown in FIG. 6, the manometer 19 has its backing slat or mounting strip 32 mounted on the outer surface of an adhesive strip 20, as of "velcro" in manner to place the zero of the manometer gauge opposite the zero of the level indicator plaque 31 on the bracket surface 18a. Thus, as shown, the dye or fluid 28 in the transparent tube 29 extends from the zero of the reservoir mount 26 to the zero of the plaque 31. Also, with the handle 34 of the three-way stop cock 21 turned to an off position, the liquid 35 in the manometer gauge glass 36 stands at zero gauge reading, in view of how the manometer slat or strip 32 has been fixed in elevation upon the adhesive strip 20.

Noticeably, in FIG. 6, the flexible tube 16a, which may also be transparent, is shown extending upwardly and to the right of the stop cock 21, to a fluid supply bottle or source of intravenous fluid, while the flexible tube 16b, which may also be transparent, extends downwardly and to the left in direction of the patient 10, not shown. In this view the manometer 19, including its gauge glass 36, is of the same size with relation to the bracket 18, as these two elements compare in FIGS. 1 and 7.

The adhesive strip 25, on which the reservoir mount 26 is positioned, (inner face of adhesive to patient); the adhesive strip 33 on which the reference level indicator plaque 31 is mounted, (inner face of adhesive to a bracket face); and the adhesive strip 20 on which the manometer mounting strip or slat 32 is mounted, (inner face of adhesive to another bracket face); may all be constructed in substantially the same manner, the well known "velcro" construction being shown with relation to the adhesive strip 20 in FIG. 5.

As indicated, the adhesive strip 20 provides four contact surfaces, an inner surface 38a being of a sticky substance which will adhere more or less firmly to the bracket surface 18a, as indicated in FIG. 5. Then, the strip 20, as of "velcro", provides an outer surface 38b of the adhesive inner strip 38a, 38b which is indicated as including a multiplicity of outwardly extending, minute piles or filaments 37, provided in accordance with the intricate processes of fabricating, as spinning this material from a plastic substance. The strip 20 further provides an outer portion 38c, 38d, with the inwardly facing strip 38c thereof indicated as including a multiplicity of looped filaments, or loops 39, extending in direction of the piles 37. Finally, the outermost surface 38d has a sticky substance thereon which will adhere more or less firmly to the back side or inner side of the slat or mounting plate 32a, indicated as of metal in FIG. 5. Also note that the outer edges 41a, 41b of the paste board or gauge strip 32b, (on which the graduations are printed), are indicated as stuck onto the "velcro" portion 38c, 38d.

The view of FIG. 5 further shows the gauge glass 36 of the manometer 19 with space therewithin through which the gauge liquid 35, not shown in color, may rise, the bottom of the gauge glass 36 being received in a boss or support ring 40 which extends upwardly from a lower lug 42b, indicated as of a transparent plastic, and corresponding with an upper lug 42a of the same material, and through which the upper portion of the gauge glass 36 guidably extends. The special construction of a "velcro" strip permits the strip to be substantially firmly attached, as by innermost face 38a, to an object, as the fixedly mounted bracket 18 on the stand column 14, and by outermost face 38d as to the inner face of the metallic plate or strip 32a, which carries the graduated pasteboard strip 32b carrying the manometer gauge glass 36. Thus the adhesive strip 20 includes the inner portion 38a, 38b thereof for substantially the vertical height of the bracket 18, whereas the outer portion 38c, 38d of the adhesive strip 20 extends only for substantially the length of the manometer mounting or support strip or plate 32a.

Because of the pile-loop contact between the adhesive strip surfaces 38b, 38c, there is strong and ample binding contact between these members wherever the manometer 19, including the strip surface 38c, may be adjustably disposed when the manometer 19 may be mounted against the strip 38b, to dispose the manometer zero opposite the reference indicia or zero or the dye level opposing the reference zero on the plaque 31. The ease of adjustment resides in the fact that, while the contact 38b, 38c holds, as the manometer 19 is carried by the outer portion 38c, 38d of the adhesive 20, separation and replacement at selective elevations can be easily accomplished between the aforesaid surfaces 38b, 38c.

The "velcro" strip 25 shown in FIGS. 1 and 6 is indicated as being similarly constructed, with the inner portion showing the pile surface 38b inboard of, and longer in length than the mounting plate 26, to the inner face of which the outer parts of the velcro strip 25, not shown, are affixed. Thus the inner portion of the "velcro" strip 25 may be affixed to the patient, as by a nonharmful adhesive, with the pile surface 38b outboard, as aforesaid, so that the mounting plate 26, including the loop strip, not shown, may be separated from the pile surface 38b and moved up or down with relation to the pile surface 38b of the "velcro" strip 25, and placed back upon the pile surface 38b to dispose the zero of the mounting plate 26 at the level of the right atrium of the patient 10.

Also the "velcro" strip 33, shown in FIGS. 1, 6, 7 and 8, is indicated as being similarly constructed, with the inner portion showing the pile surface 38b inboard of, and longer in length than the plaque 31, which has the outer portion of the adhesive 33 on the inner side thereof, while the loop surface to be in confrontation with the pile surface 38b. Thus, the inner portion of the "velcro" strip 33 may be affixed to the bracket 18, with the pile surface 38b facing outboard, and the plaque 31 may be separated from the pile surface 38b and moved up or down with relation thereto, and placed back upon the pile surface 38b to dispose the zero of plaque 31 at the same level as the zero level of the mounting plate 26 on the patient 10.

FIG. 2 is illustrative of the right atrium 24 of a patient 10 prone in bed 11, the right atrium being disposed at $H_1$ above floor level. The headstand 12 beside the head of the bed, laden with apparatus not shown, is stated as carrying thereon the apparatus shown in FIGS. 1 and 7; the view of FIG. 2 showing however the fluid container or plastic bottle 15 that is carried by the headstand column. The fixed elevation L designation in FIG. 2 is to a mean or reference level of fluid supply 15 substantially at the level of the top of the column 14. FIG. 3 shows apparatus in correspondence with the view of FIG. 2, but in this view the patient 10 is propped up in the bed level to place his right atrium 24 at an elevation $H_2$ above the floor level, thus to change (lessen) relative elevation between right atrium 24 and reference level of supply fluid 15.

The invention is to apparatus in combination, and includes the skillful use of special adhesive strips to permit rapid adjustment enabling intravenous fluid feed to a patient at controlled central venous pressures, which have to be measured continually, with rapid adjustments being required upon each shift of patient resulting in change of right atrium level, and during all emergent situations and postoperative conditions. The apparatus may be marketed as a kit or assembly of apparatus together cooperative toward the common end of permitting rapid adjustments to insure continuous supply of intravenous fluid at desired pressure rates irrespective of changes of right atrium elevation.

What I claim is:

1. Apparatus associated with supplying fluid intravenously to a patient including apparatus for rapidly adjusting a reference level indicator according to shifts in a patient reference level above floor, whereby a manometer gauge reference level may be rapidly adjusted accordingly, said apparatus comprising a first flexible transparent tube having an indicating fluid therein, first and second vertically disposed adhesive strips, said first strip being attached to said first flexible tube at one end and adapted to be attached to the patient at a predetermined reference level thereon to establish a first reference level above the floor, vertically extending support means, said second adhesive strip being secured to said support means and having a plaque means adjustable positioned thereon, said plaque means having the other end of said first tube attached thereto so as to dispose the indicating fluid level in said first tube at said first reference level, a monometer gauge, and a third vertically disposed adhesive strip removably mounted on said support means, said third strip having adjustably mounted thereon said manometer gauge whereby said gauge fluid may be positioned at said first reference level, a source of intravenous fluid supply at a fixed higher predetermined reference elevation above the floor secured to said support means, a three-way cock connected below said monometer gauge fluid, a second flexible tube from said source to said cock, and a third flexible tube leading from said cock and adapted to be connected into a patient's vein whereby in one position, said cock establishes communication of supply fluid from said source upwardly against said gauge fluid, in another position said cock establishes communication of supply fluid between the vein and gauge fluid and in a third position said cock continuing supply fluid from said source on therethrough to said vein.

2. Apparatus as claimed in claim 1 in which said adhesive strip construction comprises a first adhesive layer innermost to adhere in fixed position over a predetermined fixed length of adjustment, a second layer, as of pile filaments facing outwardly back to back from said first adhesive layer, a third layer, as of loop filaments facing the pile filament layer and substantially of length of the means to be rapidly adjustably positioned, and an outer fourth layer, back to back with said loop filament layer, and to which said means to be rapidly adjusted adheres.

3. Apparatus as claimed in claim 1 in which said first flexible tube includes a fluid reservoir at the end that is to be attached to the patient.

4. Apparatus as claimed in claim 1 in which said other end of first flexible tube extends substantially above said plaque.

5. Apparatus as claimed in claim 1 wherein said support means includes a headstand column mounting a bracket carrying said second and said third vertically disposed adhesive strips.

6. Apparatus as claimed in claim 1 in which said source of intravenous fluid supply comprises a plastic bottle suspended from a hook at the top of said support means on which said second and third vertically disposed adhesive strips are mounted.

7. Apparatus as claimed in claim 1 in which said support means includes a headstand having a styrofoam bracket fixedly disposed thereon to provide one face on which said second vertically disposed adhesive strip adjustably carries said plaque, and to provide another face on which said third vertically disposed adhesive strip adjustably carries said manometer gauge.

8. Apparatus as claimed in claim 1 in which said indicating fluid comprises a colored dye.